Dec. 27, 1960     E. L. WRIGHT     2,966,078
DRIVING MEANS FOR CONVEYORS
Filed Jan. 29, 1958
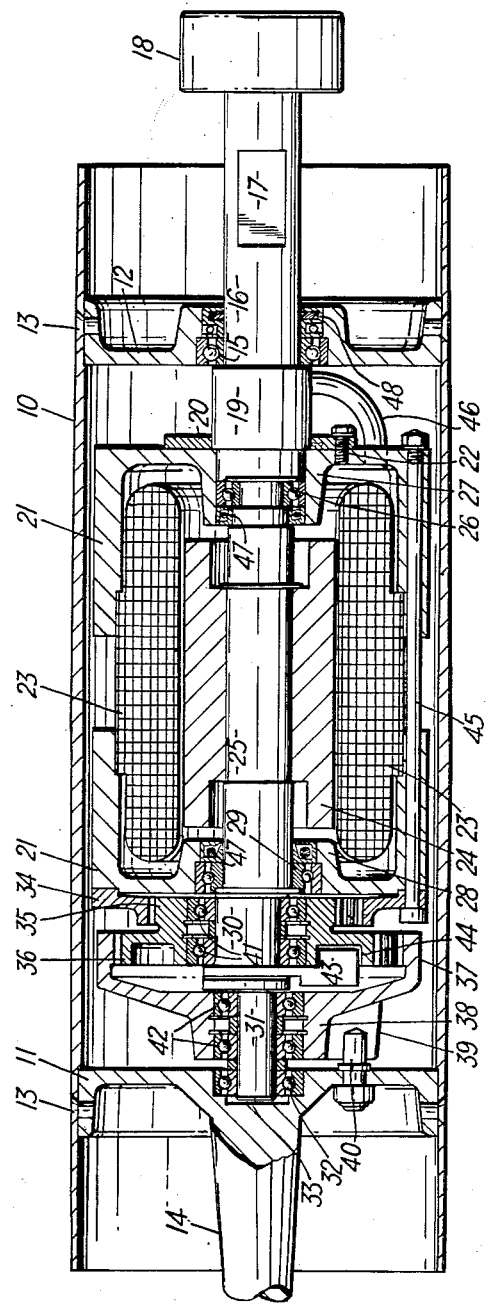
Inventor
Eric Leslie Wright
By Michael S. Striker
Attorney United States Patent Office  2,966,078
Patented Dec. 27, 1960

2,966,078
DRIVING MEANS FOR CONVEYORS

Eric L. Wright, The Mount, Scraptoft, England, assignor, by mesne assignments, to Richards Structural Steel Co., Ltd., of Phoenix Iron Works, Leicester, England Filed Jan. 29, 1958, Ser. No. 711,889

11 Claims. (Cl. 74—805)

This invention is for improvements in or relating to driving means for conveyors and has for an object to provide a simple and convenient driving arrangement which is susceptible to economical manufacture.

In accordance with the invention there is provided a conveyor driving pulley, drum or the like comprising a hollow rotatable shell, an electric driving motor for driving the shell contained in the latter and having a motor or armature requiring no external connections for its energisation, and differential reduction gearing contained in said shell for transmitting driving motion from the rotor or armature to said shell, wherein said reduction gearing comprises a compound gear wheel freely rotatable on an eccentric bearing on a driving spindle driven by said rotor or armature and fixed and rotatable ring gears meshing respectively with rigidly connected gears of said compound gear wheel, the rotatable ring gear being coupled to said shell. The invention thus provides a driving means of compact construction having its prime mover and reduction gearing contained within it the prime mover being constituted by an electric motor the electrical connections to which are not required to energise a moving part so that the consequent complications involved by employment of slip rings or the like are avoided. The form of the reduction gearing permits a comparatively large speed reduction ratio to be secured in a small space by a simple and economical construction.

In a convenient and preferred form of construction, the electric motor has an external stator with a fixed axle extending coaxially therefrom on which the shell is rotatably mounted at one end, through which axle the energising leads for the stator extend, and the fixed ring gear is secured to the said stator. The driving spindle aforementioned may form an extension of the rotor spindle and may have bearing engagement with an end shaft secured to the shell and serving to support its opposite end.

The driving motor may conveniently be an alternating current polyphase induction motor, for example a three-phase squirrel cage motor.

The shell may be rotatably mounted at one end by means of the said end shaft engaging in a bearing mounting outside the shell, and at its other end by means of an anti-friction bearing on a stationary end shaft formed by said axle and carried in fixed manner by a support beyond said other end of the shell.

A preferred form of construction of pulley assembly is illustrated in the accompanying drawing which shows the assembly in central cross section and will now be described with reference to the drawing.

In the drawing there is shown a conveyor pulley or drum comprising an outer cylindrical shell 10 preferably forming a continuous outer casing and having its ends internally recessed to receive flanged supporting discs 11 and 12 secured within the shell for example by countersunk screws 13. The supporting discs may support the drum in any convenient way. For example disc 11 shown at the left hand may be formed integrally with or have secured to its centrally a shaft 14 extending beyond the pulley and adapted to be mounted for rotation in a conventional anti-friction bearing in a bearing block (not shown). The other supporting disc 12 may carry within its central boss an anti-friction bearing 15 mounted between it and a stationary shaft end 16 projecting from the other end of the pulley. The shaft end 16 is adapted to be mounted in fixed position, for example at a location 17 and to extend to a connection box indicated diagrammatically at 18 also forming part of the shaft end mounting. The shaft end 16 extends within the pulley shell 10 terminating in a boss 19 supporting a disc 20 to which the stator 21 of an alternating current electric motor is secured by bolts 22, the stator windings being indicated diagrammatically at 23. The rotor of the motor is indicated diagrammatically at 24 and is contained within the stator 21 and secured to a rotatable spindle 25 having one end supported by an anti-friction bearing 26 mounted in a hollow boss 27 of the stator. The other end of the stator has a similar boss 28 supporting a further anti-friction bearing 29 in which the rotor spindle 25 is mounted. To the left of the figure the rotor spindle 25 is extended by an eccentric or cranked portion 30 secured to or formed integrally with the spindle 25 and beyond the eccentric portion 30 there is secured to or formed integrally with it a spindle end 31 concentric with the main part 25 of the spindle and supported by an anti-friction bearing 32 contained in a central recess 33 in the pulley supporting disc 11.

It will thus be seen that the stator 21 of the motor is fixed against rotation on the stationary shaft end 16 while the pulley shell 10 and the rotor spindle 25 mounted concentrically with the stator 21 are separately rotatable in relation thereto, the stator being centralised by its bearing 29 on the rotor spindle 25 and by the mounting of the latter between the boss 19 of the fixed shaft end and the end disc 11 on the rotatable shaft end 14. To the left of the electric motor as seen in the drawing there is mounted within the shell 10 differential epicyclic reduction gearing serving to couple the rotor spindle 25 to the pulley shell 10 through the end disc 11. The reduction gearing comprises a stationary internally toothed ring gear 34 secured to the stator 21 for example by means of its fixing bolts 45, a compound double gear wheel 35, 36 carried on the eccentric portion 30 of spindle 25 and a driven ring gear 37 with internal gear teeth and having a boss 38 arranged to be coupled to the shell 10. The boss 38 may be formed with a radial flange 39 arranged to engage with a pin or stud 40 secured to the end disc 11 in order to drive the shell 10. The double gear wheel 35, 36, is rotatable on anti-friction bearings 41 carried by the eccentric portion 30 of spindle 25 while the ring gear 37 has its boss rotatable on anti-friction bearings 42 carried on the concentric end portion 31 of spindle 25.

The gearing arrangement is such that gear 35 engages eccentrically with the stationary ring gear 34 and as the rotor spindle 25 rotates gear 35 is caused to be turned in the opposite direction about its own axis through engagement with the teeth of gear 34. Gear 36 partakes of the rotation of gear 35 and by engaging eccentrically with internal gear teeth on gear 37 causes the latter to be rotated at a substantially slower speed than that of the rotation of spindle 25. In a convenient example the stationary ring gear 34 has seventy-five teeth while the gears 35 and 36 have respectively sixty-seven and ninety-six teeth and the gear 37 has one hundred and four teeth. In this example the over-all gear reduction is in the neighbourhood of thirty to one.

In order to avoid out of balance thrusts during rotation of the rotor spindle 25 there is preferably secured to the eccentric portion 30 of the rotor spindle a counterbalance weight as indicated at 43 to compensate for the offset centre of gravity of the shaft portion 30 and gears 35, 36. As will be seen the counter balance weight 43 is housed partly in a circular recess 44 formed in the end face of gear wheel 36 there being sufficient clearance to permit the gear wheel 36 to rotate relatively to the counter weight 43.

It will be evident that by substitution of gears in the epicyclic gearing different over-all gear ratios may be obtained as required to suit particular circumstances. Such substitution can be made by using a different gear combination 35, 36, in association with either an appropriate different gear ring at 34 or an appropriate different gear at 37.

The electric motor shown in the drawings is an alternating current polyphase induction motor having an energised stator 23 and a non-energised rotor 24. A convenient form of motor is a three-phase squirrel cage induction motor. By having the energisation applied to the stator winding 23 a rotating magnetic field is created and acts on the rotor 24 to drive the latter. No rotating parts require energisation electrically and consequently the need for slip rings or the like to carry electric current is entirely avoided. As shown in the drawing energisation of the stator winding 23 is effected by means of electric connections indicated at 46 extending from the stator into the stationary shaft end 16 which is made hollow, the connections then passing cen'rally through the hollow central part of the shaft end and into the electrical connection box 18.

The end discs 11 and 12 are arranged to be fitted to the shell 10 in an oil tight manner so that the space between them and outside the electric motor can be utilised as an oil bath for lubrication of the epicyclic gearing and the various bearings, with the oil serving also as a coolant for the electric motor. If it is desired to exclude oil from the interior of the electric motor the latter may be constructed with an oil tight shell or casing and its rotor spindle 25 may be fitted with oil seals 47 inwardly of the bearings 26 and 29 to prevent ingross of oil past the spindle 25 into the motor casing. A similar oil seal 48 is fitted round the stationary end shaft 16 on the outer side of bearing 15 to prevent escape of oil through the hollow central boss or end disc. 12.

It will be appreciated that the construction described provides for use with a conveyor, a simple, convenient and compact driving assembly having a self contained driving motor and reduction gear. The construction is moreover one which is susceptible to economical manufacture with a comparatively small number of parts and with complete avoidance of any sliding contact means, such as slip rings for energisation of the motor. The outer shell 10 of the pulley or drum in the example shown may engage directly with a belt type of conveyor and serve to drive it by frictional engagement. It is however, evident that the shell 10 could readily be fitted with spaced sprockets for engagement with the chain links of chain type conveyors.

I claim:

1. A driving pulley or the like comprising in combination a hollow rotatable shell, an electric driving motor disposed within said shell and including a rotor requiring no external connections for its energisation, means mounting said shell to rotate around said driving motor, a driving spindle driven by said rotor, an eccentric portion on said driving spindle, differential reduction gearing disposed within said shell for transmitting driving motion from said rotor to said shell, said reduction gearing comprising fixed and rotatable ring gears having internal teeth and a compound gear wheel having two rigidly connected gears freely rotatable on said eccentric portion and meshing respectively with said ring gears, and means coupling said rotatable ring gear to said shell to drive the latter.

2. A driving pulley or the like comprising in combination a hollow rotatable shell, an electric driving motor disposed within said shell and including a rotor requiring no external connections for its energisation and a stator surrounding the said rotor, a fixed axle extending endwise from said stator to project from one end of the shell, means mounting said shell to rotate around said driving motor co-axially with said axle, energising leads for said stator extending at least partly through said axle, a driving spindle driven by said rotor, an eccentric portion on said driving spindle, differential reduction gearing disposed within said shell for transmitting driving motion from said rotor to said shell, said reduction gearing comprising a fixed internally toothed ring gear secured to said stator and a rotatable internally toothed ring gear and a compound gear wheel having two rigidly connected gears freely rotatable on said eccentric portion and meshing respectively with said fixed and rotatable ring gears, and means coupling said rotatable ring gear to said shell to drive the latter.

3. A driving pulley or the like according to claim 2 comprising a bearing on said axle for rotatably supporting the shell at one end, an end shaft secured to the shell and projecting from its other end for supporting the shell at said other end, and having the said driving spindle formed as an extension of the rotor spindle of the said motor.

4. A driving pulley or the like according to claim 2 wherein the driving motor is an alternating current polyphase induction motor.

5. A driving pulley or the like according to claim 2 having the said shell formed as a continuous outer casing and comprising end discs fitted respectively to the end portions of said shell to enclose the parts within it, an end shaft extending from one of the end discs coaxially with the shell to support the shell rotatably at one end, and a bearing engaging in an aperture in the other end disc and carried on said fixed axle.

6. A driving pulley or the like according to claim 5 wherein the end discs are fitted to the shell in an oil tight manner and an oil seal is provided at the bearing between said fixed axle and the end disc mounted thereon, whereby the interior of the shell forms an oil bath for lubrication of the gearing.

7. A driving pulley or the like comprising in combination a hollow rotatable shell forming a continuous outer casing an electric driving motor disposed within said shell and including a rotor requiring no external connections for its energisation, means mounting said shell to rotate around said driving motor, reduction gearing comprising internally toothed ring gears and a cooperating compound pinion disposed within said shell for transmitting driving motion from said rotor to said shell, end discs fitted to the end portions of the shell to enclose the motor and reduction gearing therein in an oil tight manner, a fixed axle extending co-axially with the shell from the motor stator through one of the said end discs, an end shaft extending co-axially with the shell outwardly thereof from the other disc, and an oil seal between the first mentioned end disc and the fixed axle.

8. A driving pulley or the like according to claim 7 wherein the interior of the shell between said end discs forms an oil bath for lubrication of the gearing and extending past the motor and at both ends thereof for cooling the motor.

9. A driving pulley or the like comprising in combination a hollow rotatable shell, an electric driving motor disposed within the said shell and including a rotor requiring no external connections for its energisation, means mounting said shell to rotate around said driving motor, a driving spindle driven by said rotor, an eccentric portion on said driving spindle, reduction gearing disposed within said shell for transmitting driving motion from said rotor to said shell, said reduction gearing comprising a compound gear wheel freely rotating on said eccentric portion and internally toothed ring gears cooperating with said gear wheel, and a counter-balance weight secured to said driving spindle to compensate for the offset weight of the eccentric portion and compound gear wheel.

10. A driving pulley or the like according to claim 9 wherein the said compound gear wheel is formed with an annular recess in an end face thereof co-axial with the eccentric portion on the driving spindle, and wherein an arm fixed to said driving spindle carries the counterbalance weight with the latter projecting into said annular recess with clearance from the walls of said recess.

11. A driving pulley or the like comprising in combination a hollow rotatable shell, an electric driving motor disposed within the said shell, and including a rotor requiring no external connections for its energisation, means mounting said shell to rotate around said driving motor, a driving spindle driven by said rotor and forming a continuation of the rotor spindle, an eccentric portion on said driving spindle, a differential reduction gearing disposed within the said shell for transmitting the driving motion from said rotor to said shell, said reduction gearing comprising a fixed ring gear carried by the stator of the driving motor and a further ring gear rotatably mounted on said driving spindle and a compound gear wheel having two rigidly connected gears freely rotatable on said eccentric portion and meshing respectively with said fixed and rotatable ring gears, and means whereby said rotatable ring gear may be coupled to said shell to drive the latter, the said driving motor and reduction gearing together forming a complete assembly adapted for insertion into and withdrawal from the shell as a single unit at one end thereof.

References Cited in the file of this patent

UNITED STATES PATENTS 1,313,537    Jones _____ Aug. 17, 1919

FOREIGN PATENTS 534,270    Great Britain _____ Mar. 4, 1941